J. T. RIDER.
SPINDLE PROTECTOR.
APPLICATION FILED FEB. 26, 1916.
1,226,008.
Patented May 15, 1917.
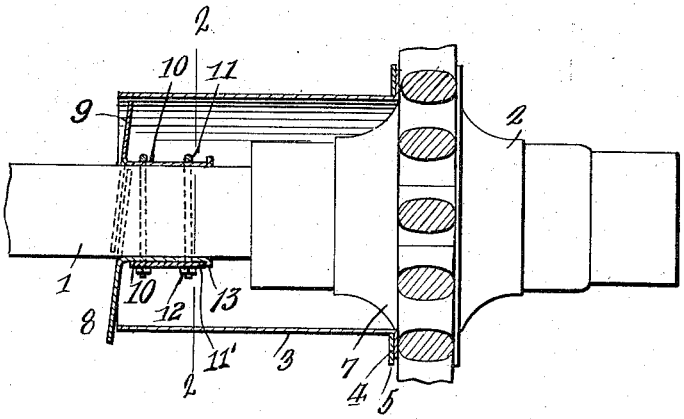
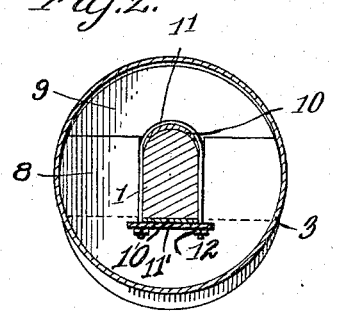
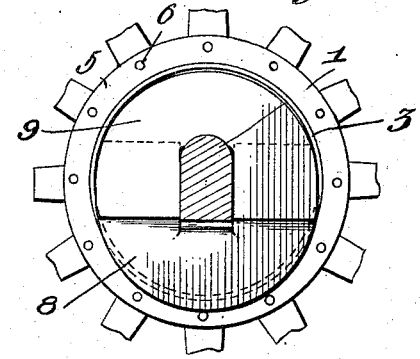
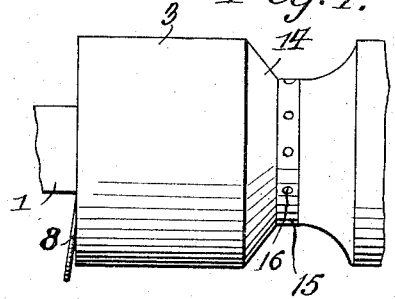
WITNESSES
INVENTOR
James T. Rider
BY
Richard Bowen.
ATTORNEY

UNITED STATES PATENT OFFICE.

JAMES T. RIDER, OF RIENZI, MISSISSIPPI.

SPINDLE-PROTECTOR.

1,226,008.  Specification of Letters Patent.  Patented May 15, 1917.

Application filed February 26, 1916. Serial No. 80,672.

*To all whom it may concern:*

Be it known that I, JAMES T. RIDER, a citizen of the United States, residing at Rienzi, in the county of Alcorn and State of Mississippi, have invented certain new and useful Improvements in Spindle-Protectors, of which the following is a specification.

My invention relates to vehicle axles and more particularly to a spindle protector.

The primary object of my invention resides in the provision of a device of the character described for shielding the spindles of wagons, buggies, surreys and other wheeled vehicles from dust, sand, dirt and other obstacles thereby allowing the wheel which is mounted on the spindle to revolve freely.

Another object of my invention resides in the provision of a cylindrical casing or band rigidly connected to a vehicle wheel which is associated with the spindle for shielding the spindle from dust and other obstacles as well as novel means rigidly associated with the spindle for closing the casing or band.

A further object of my invention resides in the provision of a novel means for removably clamping the cylinder or band to the hub of a vehicle wheel.

A still further object of my invention resides in the provision of a device of the character described that is simple in construction, efficient in operation and one that can be manufactured and placed on the market at a minimum cost.

Other objects as well as the nature, characteristic features and scope of my invention will be more readily understood from the following description taken in connection with the accompanying drawings and pointed out in the claims forming a part of this specification.

In the drawings:—

Figure 1 is a longitudinal sectional view of my invention associated with an axle and the hub of a wheel rotatably mounted thereon, the axle or spindle of the wheel being only partly shown;

Fig. 2 is a transverse sectional view taken on the line 2—2 of Fig. 1;

Fig. 3 is an end elevational view of my invention looking toward the outer end of the spindle, the latter being shown in section; and Fig. 4 is a side elevational view of a modified form of the casing or band.

Referring more particularly to the drawings in which similar reference numerals designate like or corresponding parts throughout the different views, I provide a spindle 1 on the outer end of which is rotatably mounted the hub of a vehicle wheel 2. In order to shield the spindle 1 and prevent dirt and other obstacles from adhering thereto, I have provided my improved spindle protector.

The spindle protector in this instance comprises a cylindrical casing or band 3 formed of any desirable metal having one end thereof bent outwardly to provide a flange 4 which is arranged in close relation with the spokes of the vehicle wheel 2 and secured to the inner sides thereof through the medium of a retaining ring 5, and suitable fastening devices 6, the ring being arranged exteriorly of the casing and in juxtaposed relation with the flange 5 so that the fastening devices will pass through the ring, flange and spokes. In order to prevent dirt and other obstacles from entering the casing or band from the inside, I have provided an improved closure in the form of semicircular plates 8 and 9, the latter each having a securing arm 10 struck out therefrom to provide an opening which incidentally facilitates the mounting of the plates about the spindle. The plates when connected are substantially oval shaped and the ends thereof adjacent the straight edges are lapped upon each other while the arms 10 are arranged at angles thereto to consequently arrange the plates at an angle to the axle, as illustrated, said arrangement causing all dirt to slide thereon and fall on the ground. To secure the arms 10 of the plates 8 and 9 to the spindle, I have provided a pair of U bolts 11 the respective outer and threaded ends of which engage a plate 11′ while nuts 12 finally engage the projecting threaded ends of the bolts and consequently cause the plate to coöperate with the intermediate portions of the bolts 11 in clamping the arms in position. As will be noted upon reference to Fig. 1 the plate bears against the lug 13 on the lower arm for preventing outward movement thereof.

In Fig. 4 I have shown a modified form of my invention. In this instance the casing 3 instead of being flanged has a frusto-conical end 14 which terminates in a band 15 which is rigidly secured to the inner end of the hub through the medium of suitable fastening devices 16. The closure is similar to that in the preferred form.

The operation of my invention is as follows:—

Assuming that the casing has been rigidly attached to the wheel hub and that the closure has been mounted on the spindle in the manner described, the wheel is applied to the axle 1. The outer edge of the casing will inclose the upper edge of the plate 9 while the lower end of the plate 8 which is arranged in a plane parallel with the plane of the plate 9 projects below the lower outer edge of the casing so that mud and the like which strikes these plates will slide therefrom and fall upon the ground. It will also be noted that the side edges of both of the plates are arranged in close relation with the outer edges of the casing while the casing rotates so as to remove mud that may have engaged the casing at the outer edge thereof. The plates are at all times stationary with the axle 1 while the casing revolves with the wheel so that the device prevents dust, dirt, mud and other obstacles from interfering with the rotation of the vehicle wheel on the axle.

Although I have shown and described the preferred embodiment of my invention, I desire to be understood that I am not to be limited to the exact details shown, however, I desire that great stress be laid upon the arrangement of the casing rigidly associated with the vehicle wheel as well as the novel closing means for preventing the access of dirt thereinto.

From the above description taken in connection with the accompanying drawings, it can easily be seen that I have provided a device that is simple in construction, containing but a few simple parts, that can be cheaply manufactured and assembled and when assembled can be placed upon the market and sold at a minimum cost.

It will be understood that the above description and accompanying drawings comprehend only the preferred embodiment of my invention and that various minor changes in detail of construction, proportion and arrangement of the parts may be made within the scope of the appended claims and without sacrificing any of the advantages of my invention.

Having thus fully described my invention, what I claim as new and desire to secure by Letters Patent, is:—

1. The combination with a spindle and a wheel rotatably mounted with respect thereto, of a cylindrical casing rigidly secured to the wheel hub and encompassing the spindle, and a closure mounted at an inclination on the spindle and having the upper edge arranged within the upper part of the casing and the lower edge projecting beyond the lower part of the casing and the sides thereof arranged in close relation with the inner wall of the casing to prevent the access of mud to the casing and direct the mud toward the ground and to also remove mud from the outer edge of the casing.

2. The combination with a spindle and a wheel rotatably mounted with respect thereto, of a cylindrical casing connected to the wheel hub and encompassing the spindle, semi-circular closure plates, means for mounting the plates at an angle on the spindle at an inclination so that the upper plate will be arranged within the upper part of the casing and the lower plate will be arranged within the lower part of the casing while the lower edge of the lower plate will be arranged below the lower outer edge of the casing for preventing mud entering the casing and deflecting it toward the ground, and the side edges of the plates being arranged in close relation with the outer edge of the casing for removing mud from the outer edge of the casing during the rotation of the wheel and casing.

In testimony whereof I affix my signature in presence of two witnesses.

JAMES T. RIDER.

Witnesses:
A. H. KEMP,
W. E. ELLIS.

Copies of this patent may be obtained for five cents each, by addressing the "Commissioner of Patents, Washington, D. C."